US006955698B2

(12) United States Patent
Hettmann et al.

(10) Patent No.: US 6,955,698 B2
(45) Date of Patent: Oct. 18, 2005

(54) INTAKE ARRANGEMENT FOR COMBUSTION AIR

(75) Inventors: Heinz Hettmann, Schorndorf (DE); Peter Linsbauer, Remshalden (DE)

(73) Assignee: Andreas Stihl AG & Co., Waiblingen (DE)

( * ) Notice: Subject to any disclaimer, the term of this patent is extended or adjusted under 35 U.S.C. 154(b) by 263 days.

(21) Appl. No.: 10/162,617

(22) Filed: Jun. 6, 2002

(65) Prior Publication Data

US 2002/0189214 A1 Dec. 19, 2002

(30) Foreign Application Priority Data

Jun. 13, 2001 (DE) ........................................ 101 28 788

(51) Int. Cl.[7] .......................... B01D 35/30; F02M 35/08

(52) U.S. Cl. .......................... 55/385.3; 55/318; 55/497; 55/DIG. 28; 123/198 E

(58) Field of Search ................................ 55/385.3, 318, 55/497, DIG. 28; 123/198 E

(56) References Cited

U.S. PATENT DOCUMENTS 3,186,389 A 6/1965 Sylvan
4,388,091 A 6/1983 Khosropour
5,968,214 A * 10/1999 Nagata et al. ............ 55/385.3
6,395,049 B2 * 5/2002 Knodler et al. ............ 55/385.3
6,491,734 B1 * 12/2002 Park .......................... 55/385.3
6,564,768 B2 * 5/2003 Bauer et al. ............ 123/198 E

FOREIGN PATENT DOCUMENTS

| | | |
|---|---|---|
| DE | 929 097 | 6/1955 |
| DE | 1 576 547 | 6/1970 |
| DE | 44 35 430 | 4/1995 |
| JP | 60-216062 | 10/1985 |

* cited by examiner

*Primary Examiner*—Minh-Chau T. Pham
(74) *Attorney, Agent, or Firm*—Walter Ottesen

(57) ABSTRACT

The invention relates to an intake arrangement (1) for the combustion air (2) of an internal combustion engine (3) in a handheld work apparatus (4) such as a cutoff machine, a motor-driven chain saw or the like. An air filter (5) is provided for the cleaning of the combustion air (2) drawn in via an opening (6) of a filter housing (7). To discharge dust (11) accumulated in the air filter (5) a carrier airflow (10) is provided in a flow channel (16) and the filter housing (7) is fluidly connected with the aid of a discharge tube (13) to the flow channel (16). For a dosed metering of dust (11) from the filter housing (7), a shutoff member (14) is provided and the shutoff member (14) clears or closes the fluid connection between the flow channel (16) and the filter housing (7).

15 Claims, 1 Drawing Sheet

INTAKE ARRANGEMENT FOR COMBUSTION AIR

FIELD OF THE INVENTION

The invention relates to an intake arrangement for combustion air of an internal combustion engine, especially for an internal combustion engine in a portable handheld work apparatus.

BACKGROUND OF THE INVENTION

U.S. Pat. No. 5,526,777 discloses an intake arrangement for an internal combustion engine in a portable handheld work apparatus. An air filter is provided in a filter housing for purifying the combustion air. Unfiltered air is conveyed through an opening into the filter housing by the cooling blower of the engine and is moved along the air filter. The carburetor of the engine is connected to the clean air side of the filter housing and the engine draws dust-free combustion air into a combustion chamber of the engine via the air filter. When an intensely dirty ambient is present as is often the case for cutoff machines, the dust, which is contained in the air, deposits on the air filter and quickly clogs the same. For this reason, the power developed by the engine is affected. The large dust load of the air filter requires frequent cleaning so that a maintenance intensive operation of the engine results.

SUMMARY OF THE INVENTION

It is an object of the invention to provide an intake arrangement for the combustion air of an internal combustion engine with which a low maintenance continuous operation of the engine is provided with a minimized dust load of the air filter even with heavily dust-laden ambient air.

The intake arrangement of the invention is for the combustion air of an internal combustion engine including an internal combustion engine of a portable handheld work apparatus wherein the combustion air is laden with dust. The intake arrangement includes: an air filter assembly mounted upstream of the engine for purifying the combustion air of the dust; the air filter assembly including a filter housing and an air filter mounted in the filter housing for separating the dust from the combustion air; the filter housing having an opening formed therein through which the combustion air laden with dust passes to the air filter whereat the dust is deposited; carrier airflow means for conducting away the separated dust in a carrier airflow; and, a shutoff device for connecting the air filter assembly to the carrier airflow in such a manner that the dust deposited on the air filter is fed into the carrier airflow.

The intake arrangement includes a shutoff device for drawing the deposited dust of the air filter into the carrier airflow. The carrier airflow can be spatially separated from the combustion air by the shutoff device. In this way, effects of the carrier airflow on the air filter because of pressure drops can be avoided. The dust, which is deposited on the air filter, is intermittently or continuously drawn into the shutoff device and from there is fed into the carrier airflow and conducted away from the portable handheld work apparatus by the carrier airflow. A manual opening of the air filter housing to remove the deposited dirt is not necessary.

The shutoff device is formed by a discharge pipe having a shutoff member mounted therein. The discharge pipe branches away from the filter housing on the contaminant space side of the air filter and connects the filter housing to a flow channel wherein the carrier airflow is conducted. The carrier airflow is at least directed approximately transversely to the discharge pipe or at an acute angle to the discharge pipe in the opening region of the discharge pipe at the flow channel so that a static pressure or underpressure is present in the opening region of the discharge pipe. It is practical to configure the shutoff member in the discharge pipe as a flap with which the clear cross section of the discharge pipe can be completely closed or cleared. It can be practical to provide a cell wheel sluice or chamber sluice in the discharge pipe in lieu of the flap.

During operation of the engine and the intake arrangement, combustion air is drawn first into a first contaminant space through an opening in the filter housing. The contaminant space is delimited by the filter housing and the air filter. The combustion air is laden with dust on the contaminant space side and is conducted through the air filter while depositing dust and the combustion air then passes through an intake pipe section in the carburetor into a crankcase and a combustion chamber of the engine. If dust, which deposits on the air filter, drops into the discharge pipe during operation of the work apparatus because of the action of gravity and/or inertial forces, then this dust arrives at or in the shutoff member in the discharge pipe. The shutoff member has the task to fluidly separate the carrier airflow and the flow of the combustion air in the filter housing and, as required, to remove intermittently or continuously dust which deposits in the contaminant space side part of the filter housing and to feed the same to the carrier airflow. Thereafter, the dust is conveyed away from the portable handheld work apparatus by the carrier airflow.

Especially when the shutoff member is configured as a flap, it is practical to actuate the flap manually via an extension of an rpm or speed adjusting linkage of the engine. For this purpose, all that is needed is the manual actuation of the throttle lever of the portable handheld work apparatus by an operator. It is practical to actuate the shutoff member, especially the flap, so that dust is supplied to the carrier airflow when the rpm of the engine is reduced. The flap is moved into an open position by the extension of the rpm adjusting linkage wherein the flap partially or entirely clears the clear cross section of the discharge pipe. In this way, dust from the air filter is metered to the carrier airflow intermittently, that is, with interruptions.

An additional measure for fluidly separating combustion air and the carrier airflow is effected in that a longitudinal center axis of the opening for the entry of combustion air runs in the filter housing approximately transversely to the discharge pipe. In order to keep coarse dirt particles out of the contaminant space of the filter housing, it is practical to provide a plurality of openings for the entry of combustion air in lieu of one opening, with the diameter or cross-sectional area of the plurality of openings being comparatively less than the one single opening.

The air filter is preferably configured as a flat structure having a rectangular, quadratic or circular shape or polygonal outline. The air filter extends across a filter plane to which the longitudinal center axis of the discharge pipe is parallel. The longitudinal center axis of the discharge pipe can also lie in the plane of the filter. The discharge tube, which is arranged approximately perpendicular in the work position of the work apparatus (that is, directed to the earth center point), opens into the filter housing in a funnel-like manner expanding under the air filter. In this way, the dust, which drops off of the air filter can arrive in or at the shutoff member under the action of gravity and/or of the inertial forces during manipulation of the work apparatus.

The blower, which generates the carrier airflow in the flow channel, is preferably a cooling air fan of the engine. The air filter is preferably configured as a planar or folded paper filter. In lieu of the manual operation of the shutoff member, it can be practical to provide a motoric drive such as a pneumatically or electrically operating rotational drive for the shutoff member, especially for a shutoff member configured as a cell sluice or lock.

BRIEF DESCRIPTION OF THE DRAWING

The invention will now be described with reference to the single FIGURE (FIG. 1) of the drawing which shows an exploded view of an intake arrangement according to an embodiment of the invention.

DESCRIPTION OF THE PREFERRED EMBODIMENTS OF THE INVENTION

Figure 1:
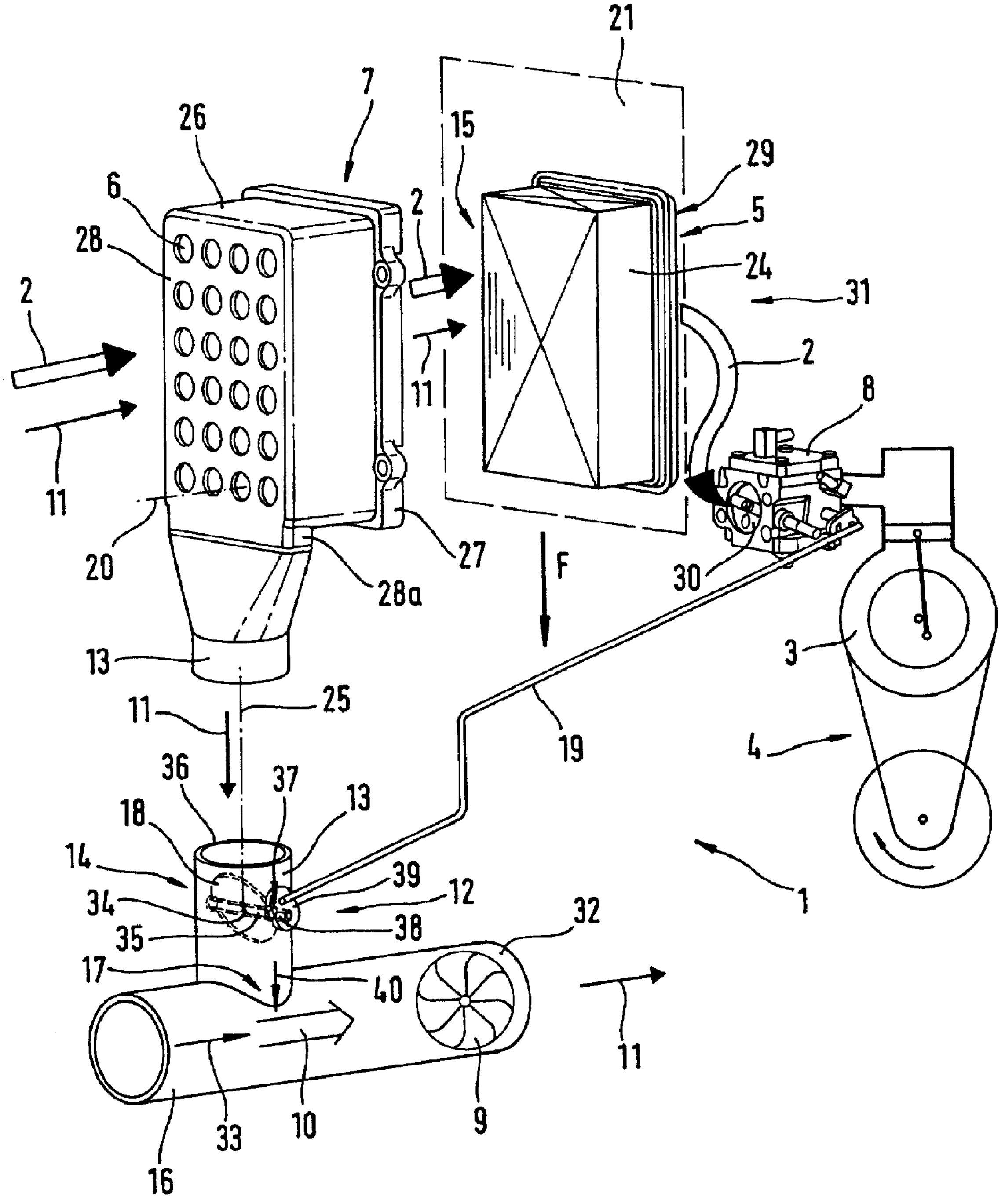

FIG. 1 shows an intake arrangement 1 for combustion air 2 of an internal combustion engine 3. The engine 3 here functions for the motoric drive of a schematically illustrated handheld work apparatus 4. The work apparatus 4 is preferably portable and is, for example, a cutoff machine. The engine 3 is suitable for driving other handheld work apparatus such as a motor-driven chain saw, brushcutter or the like.

The intake arrangement 1 shown is suitable especially for work apparatus in whose ambient large quantities of air-entrained dust 11 occurs as is the case during the use of cutoff machines, for example, in road construction. The combustion air for internal combustion engines of such work apparatus is to be purified of large quantities of dust. The dust 11 in the combustion air 2 is drawn in by suction and is to be conveyed away continuously or intermittently from the work apparatus 4 in dependence upon the dust density.

The intake arrangement 1 comprises essentially a filter housing 7 which is rectangular in its base outline. A trough-shaped housing cover 26 of the filter housing 7 is shown. Components of the intake arrangement 1 further include a flow channel 16 in which a carrier airflow 10 is conducted. The carrier airflow 10 is generated by a blower 9 shown schematically in the drawing. The blower 9 can, for example, be the cooling fan of the engine.

In the assembled condition of the intake arrangement 1, the filter housing cover 26 extends over an air filter 5. The air filter 5 is seated seal-tight with a seal in a corresponding receptacle in a peripheral edge 27 of the filter housing cover 26. The seal is vulcanized to the periphery of the air filter 5. The filter housing cover 26 includes rows of openings 6 in the wall 28 for the entry of unpurified, dust-laden combustion air 2. The wall 28 lies opposite the air filter 5.

During operation of the engine 3, the combustion air 2 is cleaned on the contaminant space side 15 of the air filter 5, which, in the embodiment shown, is configured as a folded paper air filter 24. The paper air filter 24 is seal-tight connected to an intake pipe 30 in the carburetor 8 via a flange (not shown) of the filter housing 7. The combustion air is mixed with fuel in the intake pipe and reaches a crankcase and a combustion chamber in the engine 3 as an air/fuel mixture. The air/fuel mixture is combusted in the combustion chamber for delivering expansion work.

The flow of the combustion air 2 is, in most cases, effected by the pressure fluctuations generated by the rotation or reciprocating piston in the engine 3. During operation of the engine 3, dust 11 deposits on the contaminant space side 15 and, after a certain operating time of the engine 3, the dust builds up to a dust layer or a filter cake.

This depositing process of dust on the air filter 5 can lead to negative effects in a relatively short time especially for work apparatus which are operated in ambient air which is especially dust laden. For this reason, a continuous or discontinuous removal of the collected dirt quantities is necessary. For this purpose, it is first provided that the folds of the air filter 24 lie approximately parallel to the gravitational force F so that a filter cake, which builds up, can drop off into the housing cover 26. The housing cover 26 has a discharge stub 28*a* at its lower end referred to the gravitational force. The discharge stub 28*a* communicates via a discharge tube 13 with a carrier airflow 10.

The carrier airflow 10 is provided to convey away the dust 11 from the contaminant space side 15 of the air filter 5. The carrier airflow 10 is conducted in the flow channel 16 preferably at a distance to the filter housing 7. In the embodiment shown, the carrier airflow 10 is generated by the blower 9 at an end 32 of the flow channel 16. A cooling air fan of the engine 3 is used in a practical manner as blower 9 for generating the carrier airflow 10.

The fluid connection of the filter housing 7 to the flow channel 16 takes place via the discharge tube 13 in which a shutoff device 12 is provided. The discharge tube 13 is approximately transverse to the carrier airflow 10 at least in the opening region 17 of the discharge tube 13. It can be practical to allow the discharge tube 13 to open at an acute angle to the flow channel 16 in the flow direction 33 of the carrier airflow 10. In this way, a static underpressure is effected in the opening region of the discharge tube 13. The longitudinal center axis 25 of the discharge tube 13 lies approximately parallel to the direction of the gravitational force F when the work apparatus 4 is in the work position.

It can be practical to configure a wall of the filter housing 7, especially of the filter housing cover 26, as a discharge stub 28*a*, which tapers in a funnel shape toward the discharge tube 13. In this way, dust 11, which adheres to the air filter 5, drops off under the action of engine vibrations during operation of the work apparatus 4 and is moved, under the action of gravity, into the discharge tube 13 and onto or into the shutoff member 14.

The particular longitudinal center axis 20 of an opening 6 for the entry of combustion air 2 at the filter housing cover 26 is arranged approximately transversely to the discharge tube 13. In this way, the fluid flows of combustion air 2 in the filter housing 7 and of dust 11 in the discharge tube 13 run separate from each other with respect to direction.

In the embodiment shown, the air filter 5 is a flat-shaped structure and defines a filter plane 21 with its contaminant space side projection surface 29. The air filter 5 is so tied into the filter housing 7 relative to the discharge tube 13 that the longitudinal center axis 25 of the discharge tube 13 is aligned approximately parallel to the filter plane 21. In lieu of this standing arrangement of the air filter, it can be practical to mount the air filter suspended in the filter housing so that the contaminant space side 15 of the air filter 5 is directed toward the discharge tube 13.

The shutoff device 12 includes a shutoff member 14 for removing the dust 11 from the discharge tube 13 into the carrier air flow 10. In the embodiment shown, the shutoff member 14 is a flap 18. The flap 18 is a circular flat disc having a support pin 35 which passes through the center point 34 of the disc. The flap is held and freely movable with the support pin 35 in a wall 36 of the discharge tube 13 and closes or clears the clear cross section of the discharge tube 13. The support pin 35 includes an extension 38 at its one axial end 37 whereat an angle lever 39 is fixed. An rpm or speed control linkage 19 is so connected articulately to the angular lever 39 that a rotational movement of the support pin 35 and the flap 18 is effected with an actuation of the rpm control linkage 19.

In this way, the flap can be moved via a manual actuation by an operator of the portable handheld work apparatus 4. If the flap 18 is moved into the partially open position shown in FIG. 1, then it is possible for the dust collected in the discharge tube to pass through the discharge tube in the direction of arrow 40 and into the carrier airflow 10. It is practical to couple the flap 18 with the rpm control linkage 19 in such a way that, when the rpm control linkage 19 is displaced in the sense of a speed reduction of the internal combustion engine 3, dust 11 is fed into the carrier airflow 10 that is, the flap 18 is opened. It can also be practical to provide another control member in the discharge tube 13, for example, a cell wheel sluice, instead of the flap 18.

It is understood that the foregoing description is that of the preferred embodiments of the invention and that various changes and modifications may be made thereto without departing from the spirit and scope of the invention as defined in the appended claims.

What is claimed is:

1. An intake arrangement for combustion air of an internal combustion engine including an internal combustion engine of a portable handheld work apparatus, the combustion air being laden with dust, the intake arrangement comprising:

an air filter assembly mounted upstream of said engine for purifying said combustion air of said dust;

said air filter assembly including a filter housing and an air filter mounted in said filter housing for separating said dust from said combustion air;

said filter housing having an opening formed therein through which said combustion air laden with dust passes to said air filter whereat the dust is deposited;

carrier airflow means for conducting a carrier airflow;

a shutoff device connected between said filter housing and said carrier airflow means; and, said shutoff device being movable between a closed position and an open position whereat an underpressure developed by said carrier airflow causes said dust to be drawn through said shutoff device so that said dust is conveyed away in said carrier airflow.

2. The intake arrangement of claim 1, wherein:

said air filter delimits a contaminant space in said filter housing where the dust deposits on said air filter;

said carrier airflow means including: a flow channel for conducting said carrier airflow; and, a blower for generating said carrier airflow; and, said shutoff device including: a discharge tube for connecting said contaminant space to said flow channel; and, a shutoff member mounted in said discharge tube.

3. The intake arrangement of claim 2, wherein said discharge tube opens transversely to said flow channel.

4. The intake arrangement of claim 3, wherein said shutoff member is a flap.

5. The intake arrangement of claim 4, wherein said shutoff device further includes means for manually actuating said flap.

6. The intake arrangement of claim 1, wherein said opening in said filter housing defines a longitudinal axis running approximately transversely to said discharge tube.

7. The intake arrangement of claim 1, wherein said air filter assembly is a flat structure and spans a filter plane.

8. The intake arrangement of claim 7, wherein said air filter defines a filter plane; and, said discharge tube defines a longitudinal center axis aligned approximately parallel to said filter plane.

9. The intake arrangement of claim 2, wherein said filter housing has a wall having a funnel shape leading tapered to said discharge tube.

10. The intake arrangement of claim 2, wherein said blower is a cooling air fan of said internal combustion engine.

11. The intake arrangement of claim 2, wherein said discharge tube is mounted so as to be approximately parallel to gravitational force when said work apparatus is in its work position so as to cause dust adhering to said air filter to be guided into said discharge tube under the action of the force of gravity and/or inertial forces.

12. The intake arrangement of claim 2, wherein said air filter is a planar or folded paper filter.

13. The intake arrangement of claim 2, wherein said shutoff member is a cell wheel sluice or a throughflow control member.

14. An intake arrangement for combustion air of an internal combustion engine including an internal combustion engine of a portable handheld work apparatus, the combustion air being laden with dust, the intake arrangement comprising:

an air filter assembly mounted upstream of said engine for purifying said combustion air of said dust;

said air filter assembly including a filter housing and an air filter mounted in said filter housing for separating said dust from said combustion air;

said filter housing having an opening formed therein through which said combustion air laden with dust passes to said air filter whereat the dust is deposited;

carrier airflow means for conducting away the separated dust in a carrier airflow;

a shutoff device for connecting said air filter assembly to said carrier airflow in such a manner that the dust deposited on said air filter is fed into said carrier airflow;

said air filter delimiting a contaminant space in said filter housing where the dust deposits on said air filter;

said carrier airflow means including: a flow channel for conducting said carrier airflow; and, a blower for generating said carrier airflow;

said shutoff device including: a discharge tube for connecting said contaminant space to said flow channel; and, a shutoff member mounted in said discharge tube;

said discharge tube opening transversely to said flow channel;

said shutoff member being a flat;

said work apparatus including an engine rpm control linkage; and, means for coupling said flap to said engine rpm control linkage.

15. The intake arrangement of claim 14, wherein said flap is coupled to said engine rpm control linkage so as to cause said flap to close when the engine rpm increases.

* * * * *

UNITED STATES PATENT AND TRADEMARK OFFICE

CERTIFICATE OF CORRECTION

PATENT NO. : 6,955,698 B2 
DATED : October 18, 2005
INVENTOR(S) : Heinz Hettmann and Peter Linsbauer It is certified that error appears in the above-identified patent and that said Letters Patent is hereby corrected as shown below:

Column 6,
Line 55, delete “flat;” and substitute -- flap; --.

Signed and Sealed this

Fourteenth Day of February, 2006

JON W. DUDAS
*Director of the United States Patent and Trademark Office*